US012486059B2

(12) United States Patent
Benetti

(10) Patent No.: US 12,486,059 B2
(45) Date of Patent: Dec. 2, 2025

(54) DEVICE FOR MEASURING THE TENSIONING OF A STRAPPING, METHOD FOR MEASURING SAID TENSIONING AND STRAPPING MACHINE USING THE AFORESAID MEASURING DEVICE

(71) Applicant: ITIPACK SRL, Villaverla (IT)

(72) Inventor: Bruno Benetti, Villaverla (IT)

(73) Assignee: ITIPACK SRL, Villaverla (IT)

( * ) Notice: Subject to any disclaimer, the term of this patent is extended or adjusted under 35 U.S.C. 154(b) by 150 days.

(21) Appl. No.: 18/250,067

(22) PCT Filed: May 13, 2022

(86) PCT No.: PCT/IB2022/054464
§ 371 (c)(1),
(2) Date: Apr. 21, 2023

(87) PCT Pub. No.: WO2022/238968
PCT Pub. Date: Nov. 17, 2022

(65) Prior Publication Data
US 2023/0399135 A1 Dec. 14, 2023

(30) Foreign Application Priority Data
May 14, 2021 (IT) ........................ 102021000012491

(51) Int. Cl.
*B65B 13/22* (2006.01)
*B65B 13/32* (2006.01)
*G01L 5/10* (2020.01)

(52) U.S. Cl.
CPC .............. *B65B 13/22* (2013.01); *B65B 13/32* (2013.01); *G01L 5/10* (2013.01)

(58) Field of Classification Search
CPC ......... B65B 13/22; B65B 13/32; B65B 13/18; B65B 13/185; G01L 5/10
See application file for complete search history.

(56) References Cited

U.S. PATENT DOCUMENTS 6,745,677 B2 * 6/2004 Pearson .................. B65B 59/04 100/29
7,377,213 B1 5/2008 Haberstroh et al.
(Continued)

FOREIGN PATENT DOCUMENTS

CN 117022754 A * 11/2023 ............. B65B 13/22
DE 102014225880 A1 * 6/2016 ............. B65B 13/22
(Continued)

OTHER PUBLICATIONS

International Search Report and Written Opinion dated Jul. 11, 2022, issued in PCT Application No. PCT/IB2022/054464, filed May 13, 2022.

*Primary Examiner* — Octavia Hollington
(74) *Attorney, Agent, or Firm* — Workman Nydegger

(57) ABSTRACT

A device for measuring the tensioning of a strap wound around one or more products or objects includes: a frame that supports a first head and a second head opposed, spaced apart and configured to receive a strap that is strapped externally to both of them; a movement mechanism for mutually displacing the heads, a detector for detecting the stress and deformation data of the strap when the movement mechanism mutually move the heads away to deform the strap until the relative breakage; a computer operatively connected to the detector, configured to process the data acquired by the detector and to calculate the values of the tensile load and of the elongation affecting the strap.

18 Claims, 3 Drawing Sheets

(56) References Cited

U.S. PATENT DOCUMENTS

| | | | | |
|---|---|---|---|---|
| 9,745,090 | B2 * | 8/2017 | Haberstroh | B65B 13/32 |
| 2009/0114308 | A1 * | 5/2009 | Marelin | B65B 13/185 140/93.4 |
| 2018/0311716 | A1 * | 11/2018 | Yeo | B65B 13/04 |
| 2024/0124176 | A1 * | 4/2024 | Patel | B65B 13/04 |

FOREIGN PATENT DOCUMENTS

| | | | | |
|---|---|---|---|---|
| EP | 2803588 | A1 | 11/2014 | |
| EP | 2835315 | A1 * | 2/2015 | B65B 13/22 |
| KR | 20230031031 | A * | 3/2023 | B65B 13/02 |
| WO | WO-2021095931 | A1 * | 5/2021 | B65B 13/18 |

* cited by examiner

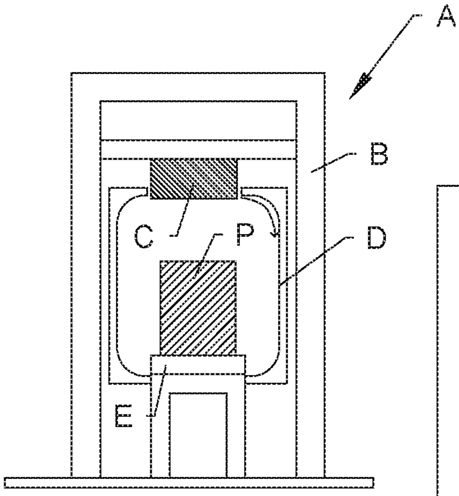
Fig.1 - Prior art
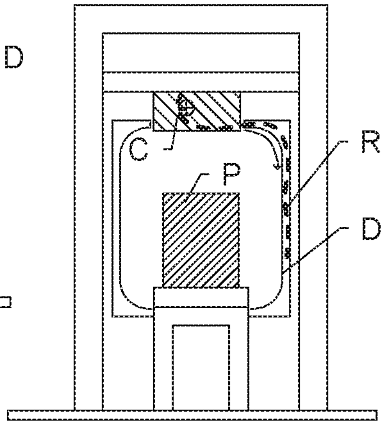
Fig.2 - Prior art
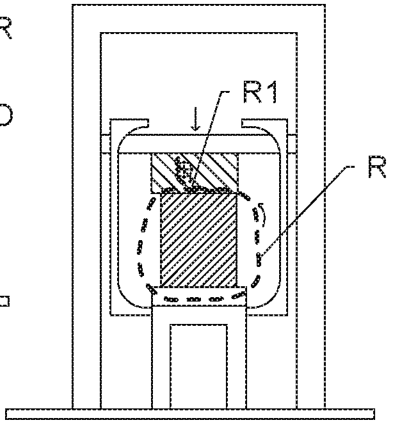
Fig.3 - Prior art
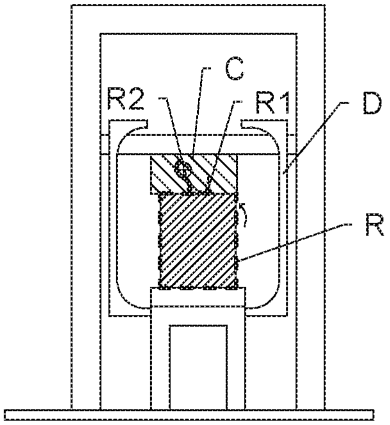
Fig.4 - Prior art
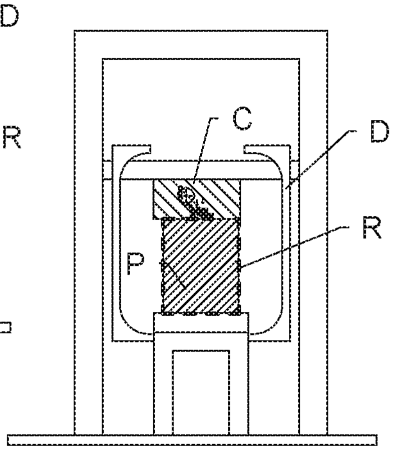
Fig.5 - Prior art
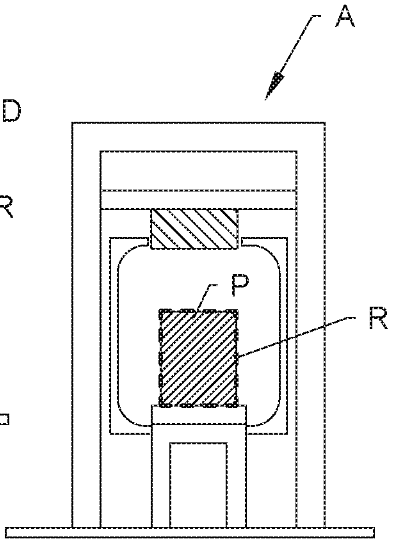
Fig.6 - Prior art

DEVICE FOR MEASURING THE TENSIONING OF A STRAPPING, METHOD FOR MEASURING SAID TENSIONING AND STRAPPING MACHINE USING THE AFORESAID MEASURING DEVICE

BACKGROUND OF THE INVENTION

1. The Field of the Invention

The invention concerns a device for measuring at least the tensioning, understood at least as stress and deformation, to which a strapping for packaging objects is subjected.

In the following description, the term tensioning will therefore be intended to mean the set of the parameters of stress, deformation, elongation, breaking load and therefore of efficiency of the welding and of the junction of a strapping that joins together elements and/or objects of any type and size.

The invention also comprises a method for measuring the tensioning using the aforesaid measuring device.

Finally, the invention comprises a strapping machine using the aforesaid device for measuring the tensioning of the strapping applied to the product that said strapping machine produces.

2. The Relevant Technology

As is well known, strapping machines are packaging machines of various automatic, semi-automatic or manual types that wrap and tightly tighten thin flexible metallic or non-metallic tapes, precisely called straps, around the objects or the products to be packaged.

Depending on the type of packaging, the straps are either wound in direct contact with the products or the objects to be packaged or in direct contact with the packaging containing them.

If the straps that are used are metallic straps, they are tightened into a ring around the elements to be packaged and their ends are first overlapped and then tensioned and finally fixed the one to the other by crimping or by welding.

Conversely, if the straps that are used are not metallic straps, their ends are joined either by crimping with the addition of a metallic junction element or by melting.

If the junction is made by welding, the strapping machines are provided with one or more welding torches.

Packaging with strapping is also widely used to package, according to a bundle configuration, elements with predominantly longitudinal development, for example profiles, bars, tubes and similar products, metallic and non-metallic, which in order to be easily stored, handled and transported must be tightly tightened together using usually several annular strappings suitably arranged spaced apart along the longitudinal direction defined by the same elements.

By way of example of the prior art, the strapping of a product is described below with reference to FIGS. 1 to 6 and using an automatic strapping machine, which in the figures is collectively referred to as A.

Obviously, the prior art described is also applicable to any strapping machine of other type, automatic, semi-automatic or manual.

With reference to FIG. 1, it can be seen that the strapping machine A comprises a framing B that supports a strapping head C, sliding channels D of the strap and a rest plane E for the products to be strapped, e.g., a package P.

The strapping operation involves the execution of the following steps:

throwing the strap R from the strapping head C along the sliding channels D, as can be seen in FIG. 2;

winding the strap R around the package P until it returns in the strapping head C, blocking it at a point R1 and bringing the strapping head C closer to the package P, as can be seen in FIG. 3;

recovering the strap R by extracting it from the sliding channels D, tensioning it so that it peripherally adheres to the package P and then blocking it at a second point R2, as can be seen in FIG. 4;

if necessary, reducing the tension of the strap R upstream of the point R1 to reduce the shear stress, cutting the strap R and then joining the ends thereof by welding or crimping, as can be seen in FIG. 5;

the strapping head C releases the strap and the junction causing a slight loosening of the strap with loss of residual tensioning on the package and then it moves away from the package P, as can be seen in FIG. 6, until it returns to the initial position in FIG. 1 to repeat the strapping cycle.

It is important that the winding, tensioning and welding operations of the ends of the straps are carried out in a workmanlike manner so that, after the binding cycle has been completed, the straps are able to ensure the stability of the element or of the elements that have been strapped.

In particular, in the case of strapping several elements, e.g., of elements with mainly longitudinal development strapped into a bundle, the tensioning of the straps must be adequate to exert on the elements themselves the tightening force that is useful to keep them stably joined into a bundle after packaging.

In addition, the tensioning of the straps must also be adequate to withstand the dynamic thrust that the bundled elements exert on them during the abrupt movements to which the bundled elements are subjected during transport.

The tensioning of the straps must also be adequate to withstand the additional thrust that the bundled elements exert against the straps themselves when stacked on top of each other in warehouses and in the storage facilities.

Finally, when executing the strapping cycle it must be taken into account that, after the tensioning, the cutting and the welding/sealing have been carried out, the welded strap is released onto the package, with consequent loosening of the straps mentioned above, which must be kept as limited as possible in order not to jeopardise the tightness of the strapping.

In known automatic or semi-automatic strapping machines, or in the manual strapping systems, the tensioning of each strap during packaging is achieved by using strapping heads provided with electric motors or hydraulic or pneumatic actuators, and the operator intervenes on means for controlling the aforesaid motors or actuators in order to adjust the tensioning value.

For example, if the strapping head uses brushless type electric motors, the operator intervenes on the torque regulator, whereas if the strapping head is provided with hydraulic or pneumatic actuators, the operator intervenes on the means for adjusting the pressure of the fluid that moves them.

Tensioning adjustment according to the prior art, however, has a number of drawbacks and limitations, which are listed below.

The tensioning adjustment that is carried out at the beginning of a processing is based on the results of the tests of resistance of the welding joint or of crimping of the straps, but this adjustment is then not modified based on the multiple factors that intervene during strapping operations and modify it.

It is understood that this entails a number of acknowledged drawbacks, one of which consists in the fact that during strapping operations different welding conditions of the ends of the straps can take place, with consequent variations in the resistance of the welded junction and, more generally, of all those parameters that determine the welding efficiency.

Another drawback consists in the fact that, according to the prior art, no specific objective criteria are followed to adjust the tensioning of the straps based on the external geometry of the bundle of elements that are strapped together, and this, notoriously, involves variations in the tightening force of the elements that are strapped.

A further drawback consists in the fact that possible geometric differences among the elements that make up the batch of elements to be strapped into a bundle lead to changes in the external shape of the bundles and generate different tightening conditions of the bundles during strapping processing.

Other drawbacks occur during the normal use of the strapping machine and depend, for example, on phenomena of normal or excessive wear of the components, incorrect settings, inadequate maintenance, replacement of the strapping band being used, abnormal variations in the supply of the operating fluids to the heads, and others.

Last but not least drawback, as a result of the above mentioned drawbacks, it consists in the fact that it is very difficult to guarantee an optimal and repetitive strapping quality.

SUMMARY OF THE INVENTION

The aim of the present invention is therefore to eliminate the drawbacks that have been highlighted above.

It is an aim of the present invention to realize a device for measuring the parameters that define the strapping for packaging objects of any type bound together in any geometric configuration, and particularly of elements with predominantly longitudinal development arranged into a bundle.

It is therefore the aim of the invention that the measuring device makes it possible to determine the tensioning of the straps, the term tensioning being understood to mean the set of the parameters of stress, deformation, elongation, breaking load and thus of efficiency of the welding and junction of a strapping that joins together elements and/or objects of any type and size.

In particular, the aim is to determine the tensioning of the straps for packaging elements with predominantly longitudinal development arranged into a bundle.

It is a further aim of the invention that the measuring device makes it possible to measure the tensioning, the deformations, the elongations, the breaking loads and the yield strengths of a single stretch of strap with a predetermined length that is sampled from a strap wound into a reel that is used for strapping.

It is another aim to realize a method that, using the aforesaid measuring device, allows to measure the strapping parameters, especially the stresses, the deformations, the elongations, the breaking loads and the yield strengths of a strapping that joins together elements and/or objects of any type and size.

Not least aim that the measuring device of the invention can be used in any automatic, semi-automatic or manual strapping machine or system. The aims listed are achieved by the measuring device according to claim 1 to which reference will be made, by the measuring method using the aforesaid device and by the strapping machine using the aforesaid measuring device.

Advantageously, the measuring device and the measuring method that uses it allow, compared to the prior art, a significant improvement in the quality of the strapping that a strapping machine produces.

Still advantageously, the measuring device and the measuring method that uses it allow a strapping machine to obtain a constant and more reliable strapping quality compared to the prior art.

BRIEF DESCRIPTION OF THE DRAWINGS

The purposes and advantages listed will be better highlighted below during the description of a preferred, but not exclusive, embodiment of the invention which is given with reference to the attached drawings in which:

FIGS. 1 to 6 represent a strapping method and system according to the prior art;

Figure 7:
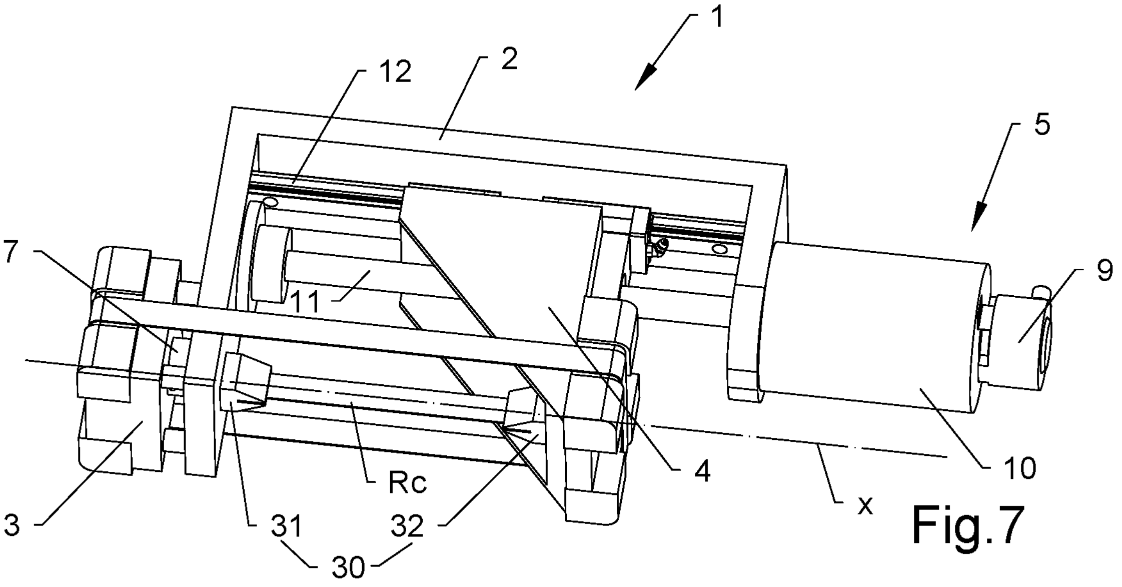
FIGS. 7 to 9 represent the measuring device of the invention.
Figure 8:
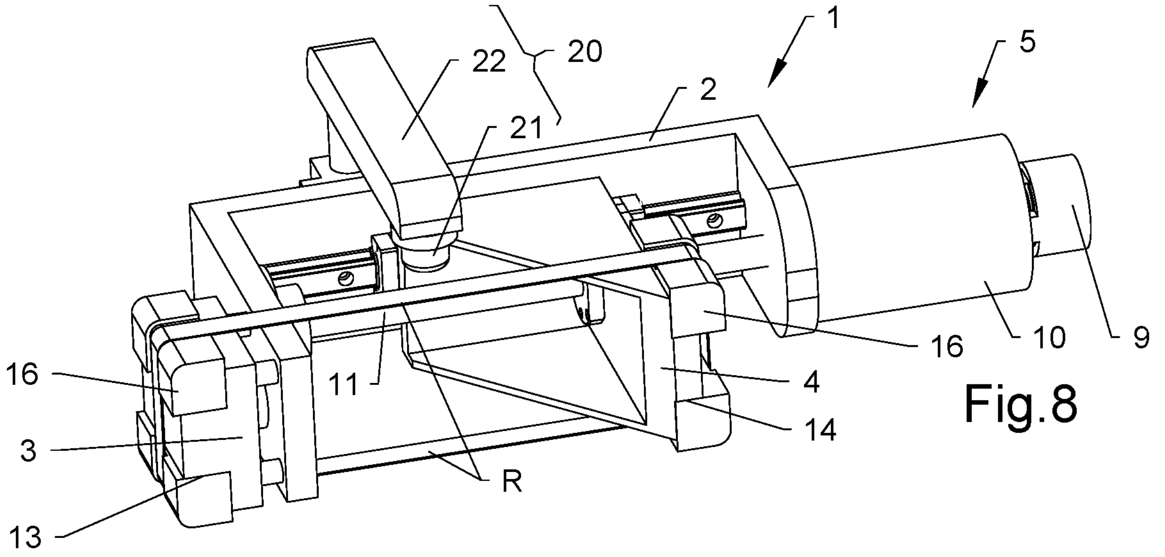
Figure 9:
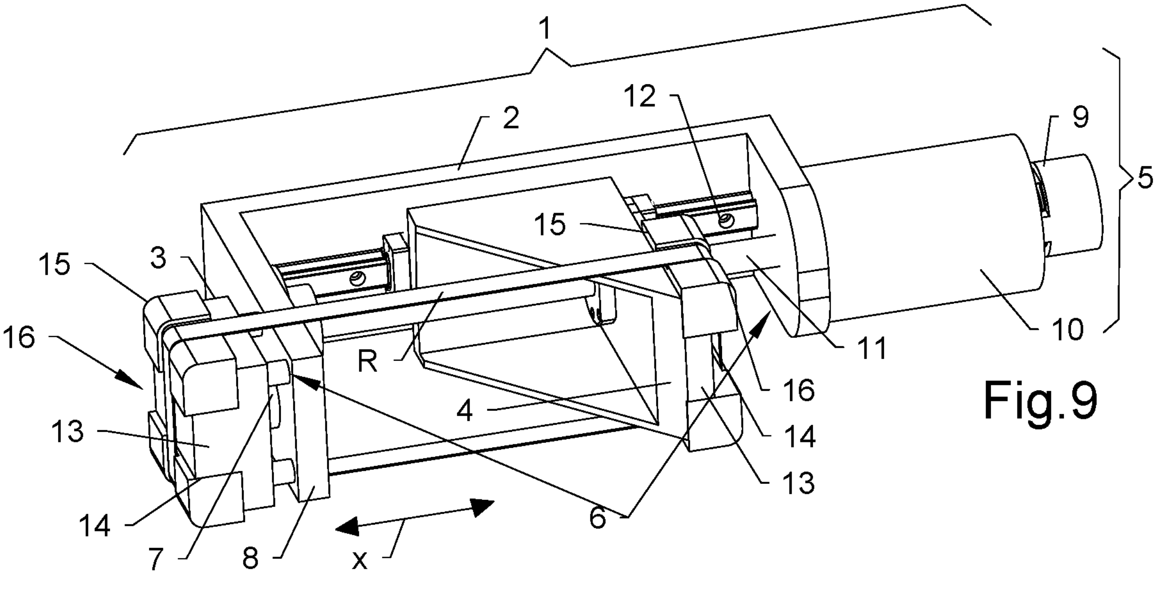

The measuring device of the invention is represented in different views in FIGS. 7 to 9 where it is collectively referred to with 1.

DETAILED DESCRIPTION OF THE PREFERRED EMBODIMENTS

The measuring device 1 is used to measure the tensioning, understood at least as the set of the stress, deformation, elongation, breaking load and welding and junction efficiency parameters of at least one strap that packages elements of various kind and that is tightened in direct contact with the elements to be packaged or in contact with the container that houses them.

It is considered appropriate to specify that in the description the term "strapped" may be used to indicate a strap wound and tightened around one or more objects or products.

In the remainder of this description, as has already been mentioned above, the term tensioning will be used to refer to the set of the parameters of stress, deformation, elongation, breaking load and therefore of welding and junction efficiency of a strapping that joins together elements and/or objects of any type and size.

The device of the invention is, however, particularly suitable for measuring the parameters defining the tensioning as defined above of at least one strap that wraps and tightly tightens into a bundle a plurality of elements with predominantly longitudinal development, such as metallic and non-metallic profiles, tubes and bars for various use.

During the following description, reference will therefore be made to the strapping of bundled elements with predominantly longitudinal development, but it is understood that the measuring device of the invention may also be applied to measure the parameters defining the strapping tensioning of elements of any type in terms of geometry, material and product sector to which they belong, possibly also contained in respective packagings.

The measuring device 1 of the invention is essentially a strapping simulator that can be applied to any automatic and semi-automatic strapping machine and also to any strapping device of the manual type.

In the following discussion, the device of the invention is described in its application to a strapping machine of the automatic type provided with an arched strapping head in which, in order to determine the strapping parameters, particularly the tensioning is used which affects the strap during and after strapping and which influences and determines the quality of the strapping that the strapping machine performs.

According to the invention, the measuring device 1, as can be seen in FIGS. 7 to 9, comprises a frame 2 that supports a pair of heads that simulate the geometry of the product to be strapped and which comprise a first head 3 and a second head 4 facing each other, spaced apart and opposed that are configured to receive a strap R which is wound externally to both according to a ring configuration.

The frame 2 also supports movement means 5 that are configured to mutually displace at least one of the heads 3, 4 according to a straight direction X and detection means 6 for detecting at least the stress and deformation values affecting the strap R when it is wound outside the heads 3, 4 and when the movement means 5 mutually move the heads 3, 4 away to deform the strap R until its breakage.

It is considered appropriate to specify that the movement means can be of any type and therefore electric, fluid or manual.

In addition, these movement means may exert the mutual displacement of the heads even according to several directions.

Computer means, not represented in the figures, also belong to the device, which are operatively connected to the detection means 6 and which comprise storage means in which a computer product is stored and at least one microprocessor which is configured to execute the aforesaid computer product.

The aforesaid computer product is configured in such a way that, when it is being processed, it processes the data acquired by said detection means 6 and calculates the values of at least the tensile load and the elongation affecting the strap R.

With regard to the detection means 6, it can be seen in FIGS. 7 to 9 that they comprise a load cell 7 that is interposed between the first head 3 and a contrasting surface 8 belonging to frame 2 and is configured to detect the values of the tension acting on the strap R.

The detection means 6 also comprise an encoder 9 that belongs to the movement means 5 to which the second head 4 is associated and is configured to detect the displacements that the movement means 5 impose on at least one of the heads 3, 4.

With regard to the movement means 5, it can be seen in the figures that they comprise a gear motor unit 10 and a ball recirculating screw 11, which is connected to the gear motor unit 10 and put into rotation by the same, and to which the second head 4 is coupled.

In another different embodiment, which is not described and represented, the movement means can be connected to both heads in order to put them into mutual movement simultaneously or one with respect to the other.

In addition, between the gear motor unit 10 and the ball recirculating screw 11 there is interposed the encoder 9 which is connected to both the gear motor unit 10, and to the ball recirculating screw 11.

It is also noted that the second head 4 is supported by a linear guide 12, which is fixed to the frame 2 and is configured to define the straight direction X of displacement of at least the second head 4 itself.

In another different embodiment that is not described and represented, if both heads can be put into motion, both will be supported by a linear guide.

Other guide means belonging to the prior art may be used as an alternative to the linear guides.

In order to simulate as closely as possible the actual strapping conditions, the first head 3 and the second head 4 are provided with hooking profiles 13 which are configured to removably accommodate the coupling of hooking counter-profiles 14 corresponding to them that belong to shaped caps 15 having the external profile 16 equal to the external profile of the elements with predominantly longitudinal development that are tightened into a bundle by strapping.

In addition, the aforesaid shaped caps 15 will be made of a material whose mechanical characteristics are as similar as possible to those of the material to be strapped so that, during strapping, the operating conditions are as close as possible to the actual strapping conditions.

It is therefore evident that pairs of shaped caps 15 having an external profile 16 that can be conjugated to the external profile of the elements being strapped will be used.

In addition, the detection means 6 preferably also comprise means for measuring the torque applied by the movement means 5 and means (not represented but of a known type) for acquiring the electrical power supply values of the welding machine that welds the ends of the strap R.

There will also be a timer (not represented but of a known type) that detects the times for winding, tensioning, welding and releasing the strap R, and possibly a time scale for monitoring the detected values over time.

The detection means 6 preferably, but not necessarily, also comprise means for acquiring images 20 of the welding that is carried out in the junction area of the strap R and which are schematically represented in FIG. 8.

Such image acquisition means 20 comprise an image acquisition device 21, e.g., a camera, video camera or similar means, associated with a support arm 22 that places the image acquisition means 20 above the strap R at the welding.

The device 1 of the invention also comprises a pair of gripping members 30 which can be seen in FIG. 7, which are arranged coaxial and opposed to each other according to the straight direction X and which comprise a first gripping member 31 fixed to the frame 2 and a second gripping member 32 fixed to the second head 4.

The ends of a segment of sample strap Rc which is put under traction by the second head 4 to detect its tensioning values and in particular the breaking load, the elongation and the yield strength, are fixed to the gripping members 30.

The sample strap Rc consists of a segment of the same strap R that is used for strapping in the strapping machine, and the value of the tensile breaking load that is detected on the sample strap Rc is used to determine the strapping efficiency value understood as the ratio between the value of the breaking load detected by simulating the strapping between the heads 3, 4 and the value of the breaking load detected on the sample strap Rc.

As far as the computer product is concerned, which, as it has been said, is stored in the storage means of the computer means which are not represented in the figures, when it is being processed, it calculates the values:

of the tensile load and of the elongation affecting the strap R during the step of winding and of tension externally to the heads 3, 4;

of the tensile load and of the elongation affecting the strap R at the end of the winding and tension step;

of the time for the winding and tension of the strap R;

of the tensile load and of the elongation affecting the strap R in the tension and stretching steps;

of the time for the welding/junction of the ends of the strap R;

of the tensile load and of the elongation affecting the strap R after the welding/junction of the ends thereof and upon release after strapping;

of the time of the tension loss of the strap R after the welding/junction of the ends thereof, before bringing the strap R to break;

of the tensile load and of the elongation of the strap R after welding/junction and until the relative breakage;

of the tensile time of the strap R after welding/junction and until the relative breakage;

of the tensile load and of the elongation of the sample strap Rc until the relative breakage;

of the welding/junction efficiency.

The aforesaid values are made available to the user in a report. In particular, the detected and calculated values can be marked by means of a printer or similar means on the strap that is applied to the products during the strapping cycle.

These values can also be recorded on labels to be applied to the strapped products, and finally they can also be stored on the computer media of the quality system in order to ensure the traceability of the strappings carried out on the products.

The user, by cross-referencing the qualitative analysis of the strapping with the records indicated in the report, will be able to assess the necessity and/or advisability of carrying out any adjustment interventions on the strapping machine.

The measuring device 1 of the invention can be applied to any automatic or semi-automatic strapping machine, and in general also to any manual strapping system, which will therefore also be an object of the present invention.

Thus, the method for measuring the tensioning of a strap R using the measuring device 1 of the invention can be described by reference to any automatic or semi-automatic strapping machine and in general also to any manual strapping system.

Hereinafter, the measuring method is described with reference to an automatic strapping machine 50 of the arched type, represented in the schematic FIGS. 10 and 11 and also being an object of the present invention, which comprises a frame 51 with a rest surface 53 for the objects or elements to be strapped, a strapping head 52 supported by the frame 51 and the measuring device 1 of the invention which is associated with support and displacement means of any type, manual or automatic, not represented in the figures, belonging to the frame 51.

In another different embodiment, the measuring device 1 may be associated with a support structure independent of the frame 51 and will be inserted into the strapping machine 50 or other strapping system in an automatic, semi-automatic or manual manner.

In a further embodiment, the measuring device 1 may be carried by hand by the operator and placed in a suitable position to perform the test.

Figure 10:
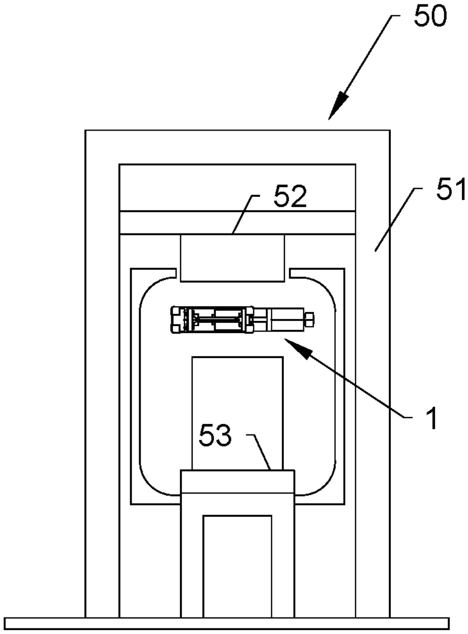
FIGS. 10 and 11 represent two different views of a strapping machine using the measuring device of the invention.
Figure 12:
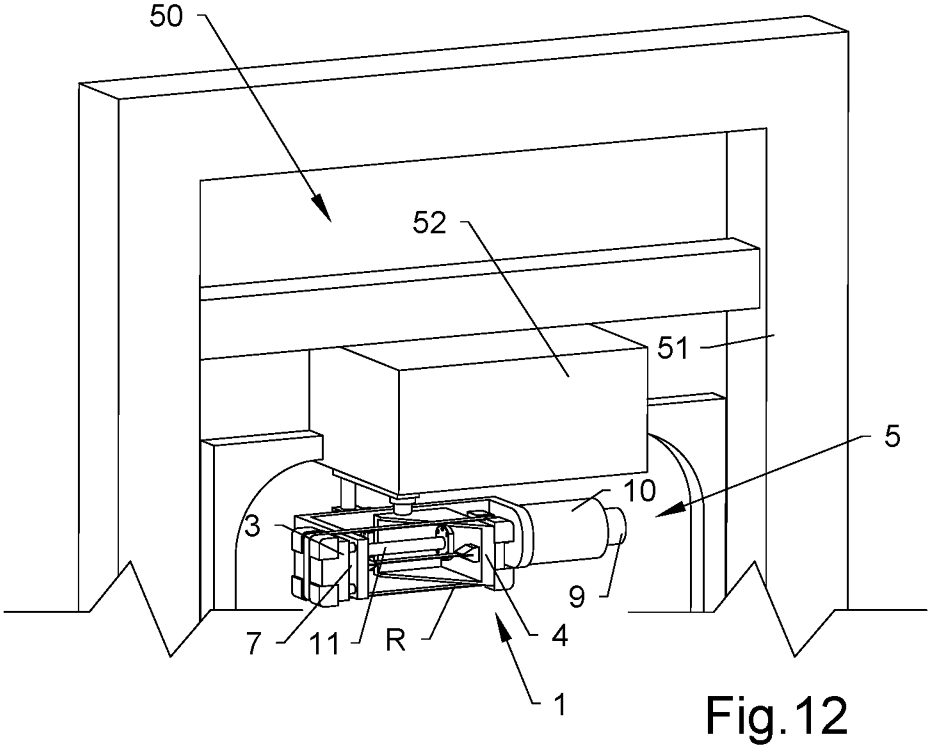
FIG. 12 represents an enlarged detail of FIG. 11 in axonometric view.

The support and displacement means, not represented in the figures, support the measuring device 1 which, during the operation of the strapping machine and thus during the strapping operations, remains in a position spaced apart from the strapping head 52, as can be seen in FIGS. 10 and 12.

In particular, the measuring device 1 is arranged so as not to hinder the strapping operations of the product and is inserted automatically, semi-automatically or manually into the strapping machine or into the strapping system, as can be seen in FIG. 10.

Figure 11:
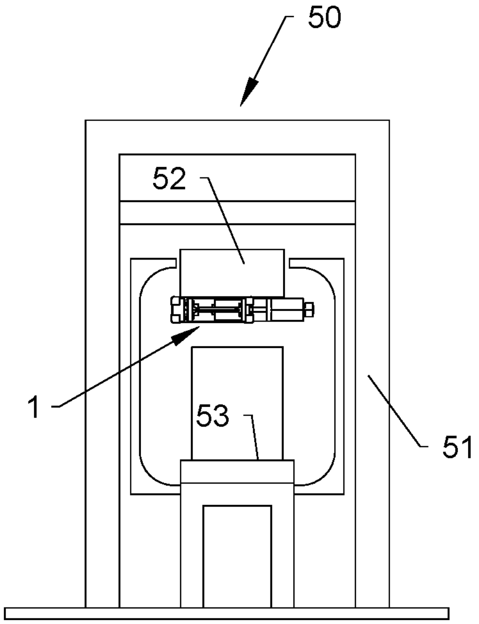

The strapping machine or the strapping system will apply the strap to the measuring device 1, as can be seen in FIGS. 11 and 12.

In order to measure the strapping tensioning, the strapping machine 50 is stopped and, after applying to the heads 3 and 4 the shaped caps 15 having the profile that reproduces the external profile of the elements or objects to be strapped, by means of the displacement means the measuring device 1 is displaced in order to move the heads 3 and 4 closer to the strapping head 52 in the condition represented in FIG. 11.

It should be noted that, usually, the caps 15, which as mentioned are interchangeable inserts, are fixed to the heads 3 and 4 and are already set up to simulate the product being strapped by that specific strapping machine.

Obviously, if the product to be strapped is changed, the caps 15 are replaced with others having the profile that reproduces the external profile of the new product to be strapped.

Furthermore, as already specified, the geometry and the characteristics of the material with which the caps 15 are made must be chosen appropriately in order to reproduce as closely as possible to reality the conditions under which the strapping of the products or of the objects takes place.

To measure the tensioning, the strapping machine 50 wraps a strap R externally to the heads 3, 4 and at the end of the winding the ends of the strap R are joined by crimping or welded by means of one or more welding heads, not represented in the figures.

The second head 4 then moves away from the first head 3, or both mutually if they are both movable, by means of the movement means 5, and the strap R is thus put under traction until the relative breakage.

It is also possible to measure the tensioning of a sample strap Rc.

The data acquired by the detection means 6 are then recorded in a report together with the values listed above and calculated by the computer product.

As mentioned above, the measuring device 1 of the invention can be applied to any automatic or semi-automatic strapping machine or to any manual strapping system to measure the characteristics of strapping that the strapping machine produces.

Operationally, at the user's choice, the strapping tensioning measurement can be carried out in the interval between two successive strapping operations or after a discrete number of strapping operations.

Furthermore, the image acquisition means 20 of the junction could compare the junction made with standardized junctions, or with all the junctions previously made, and possibly instruct the computer means to carry out a measurement of the strength of the junction and therefore of the strapping.

On the basis of what has been described, it is understood that the invention achieves the aim of realizing a device for measuring 1 the parameters that define the strapping for packaging objects.

In particular, the measuring device 1 achieves the aim of determining the values of the parameters that define the stress and the deformation of a strapping while packaging objects, and in particular of calculating the tensile load, the elongation, the yield strength and the breaking load affecting the strapping.

Knowing these data makes it possible to keep the strapping operations in a strapping machine under control by making any corrections to the adjustment parameters of the strapping machine itself, which are necessary in order to keep the strapping quality within the standards set by the user.

Finally, the aim is also achieved that the measuring device 1 of the invention is applicable to any automatic or semi-automatic strapping machine or to any manual strapping system, in which case any known strapping machine will be converted into a strapping machine or into a strapping system of the present invention.

In the execution step, modifications may be made to the measuring device of the invention, all of which, if they fall within the scope of the following claims, shall be deemed to be protected by this patent.

The invention claimed is:

1. A device for measuring a tensioning of at least one strap wound and strapped around at least one product or one object, comprising a frame that supports:

- a first head and a spaced apart second head facing each other, the first head and second head being configured to receive a strap that is wound about and strapped externally to both the first head and the second head according to a ring configuration;
- movement means configured to displace at least one of the first head or the second head relative to the other according to at least one direction;
- detection means for detecting information relating to tension acting on the strap when the strap is wound about and blocked outside the first head and the second head and when the movement means displaces at least one of the first head or the second head relative to the other to deform the strap;
- computer means operatively connected to the detection means and comprising:
  - storage means in which a computer product is stored; and
  - a microprocessor that is configured to execute the computer product,
- the computer product, when being executed by the microprocessor, being configured to use the data detected by the detection means to calculate a value of at least of a tensile load on the strap and an elongation of the strap when the first head or the second head has been moved relative to the other to deform the strap.

2. The measuring device according to claim 1, wherein the detection means comprise at least one load cell interposed between the first head and a contrasting surface belonging to the frame, the load cell being configured to detect the information relating to tension acting on the strap.

3. The measuring device according to claim 2, wherein the detection means also comprise at least one encoder disposed on the movement means to which the second head is associated, the encoder being configured to detect displacements that the movement means impose on at least one of the first head or the second head.

4. The measuring device according to claim 2, wherein the movement means comprise:

- at least one gear motor;
- a recirculating ball screw connected to the gear motor and put into rotation by the same, at least the second head being coupled to the recirculating ball screw, the at least one encoder being interposed between the gear motor and the recirculating ball screw.

5. The measuring device according to claim 1, wherein the second head is supported by a guide, the guide being configured to define a respective straight direction of displacement of the second head.

6. Measuring device according to claim 5, wherein the guide comprises at least one linear guide fixed to the frame.

7. The measuring device according to claim 1, wherein the first head and the second head each have hooking profiles.

8. The measuring device according to claim 1, wherein the detection means further comprise at least one timer which detects at least times for winding, tensioning and welding the strap.

9. The measuring device according to claim 1, wherein the computer product, when being executed by the microprocessor, calculates values:

- of the tensile load on the strap and of the elongation of the strap during winding and tension of the strap externally to the first head and the second head;
- of the tensile load on the strap and of the elongation of the strap at the end of winding and of tension of the strap;
- of a time for winding and tension of the strap;
- of a time for welding, crimping or melting of ends of the strap;
- of the tensile load on the strap and of the elongation of the strap after welding, crimping or melting of ends of the strap;
- of the tensile load on the strap until relative breakage after welding, crimping or melting of ends of the strap;
- of a yield strength and of a breaking load of the strap,
- the values being made available to a user in a report.

10. The measuring device according to claim 9, further comprising means for storing and/or displaying the values.

11. The measuring device according to claim 1, wherein the detection means also comprise means for acquiring electrical power supply values for a welding machine that welds ends of the strap.

12. The measuring device according to claim 1, wherein the detection means also comprise image acquisition means for welding of the welding machine.

13. A method for measuring the tensioning of a strap using the measuring device according to claim 1, the measuring method comprising the following operations:

- setting up a strapping machine or a strapping system;
- inserting the measuring device into the strapping machine or into the strapping system in a suitable position so that the first head and the second head are positioned at a strapping head of the strapping machine or the strapping system;
- applying shaped caps externally to the first head and the second head so as to reproduce a strapping configuration of at least one product or one object to be strapped;
- winding a strap externally to the first head and the second head;
- at the end of winding, welding/joining ends of the strap;
- putting the strap under traction by moving one of the first head or the second head relative to the other until breakage of the strap;
- recording values of tensioning of the strap in a report.

14. A strapping machine or strapping system comprising:

- a frame;
- a rest surface for the at least one product or one object to be strapped;
- a strapping head, supported by the frame, for applying a strap to the at least one product or one object; and the device for measuring the tensioning of the strap, according to claim 1.

15. The strapping machine or strapping system according to claim 14, wherein the device for measuring is associated with support and displacement means for measuring an approach/distancing of the measuring device to/from the strapping head.

16. The strapping machine or strapping system according to claim 15, wherein the means for supporting and displacing the measuring device are associated with the frame.

17. The strapping machine or strapping system according to claim 15, wherein the means for supporting and displacing the measuring device are separate and independent from the frame.

18. A device for measuring a tensioning of a strap wound and strapped around at least one product or one object, comprising a frame that supports:

a first head and a spaced apart second head facing each other, the first head and second head being configured to receive a strap that is looped externally about the first head and the second head in a ring configuration;

a mover configured to displace at least one of the first head or the second head relative to the other;

a load cell disposed between the first head or the second head and a contrasting surface of the frame, the load cell detecting information relating to a force applied to the strap when the strap is looped externally about the first head and the second head and when the mover displaces at least one of the first head or the second head relative to the other to deform the strap;

a computer operatively connected to the load cell and comprising:

memory in which a computer product is stored; and a microprocessor that is configured to execute the computer product, the computer product, when being executed by the microprocessor, being configured to use the information detected by the load cell to calculate a value of a tensile load on the strap and an elongation of the strap resulting from when the mover displaces at least one of the first head or the second head relative to the other to deform the strap.

* * * * *